United States Patent

[11] 3,616,980

| [72] | Inventor | John Arthur Padilla<br>Cambridgeshire, England |
|---|---|---|
| [21] | Appl. No. | 780,406 |
| [22] | Filed | Dec. 2, 1968 |
| [45] | Patented | Nov. 2, 1971 |
| [73] | Assignee | The Cleveland Bridge and Engineering<br>Company Limited<br>Darlington, England |
| [32] | Priority | Dec. 12, 1967 |
| [33] | | Great Britain |
| [31] | | 56,510/67 |

[54] FRICTION WELDER
4 Claims, 6 Drawing Figs.

[52] U.S. Cl........................................................ 228/2,
29/470.3, 156/73
[51] Int. Cl....................................................... B23k 27/00
[50] Field of Search........................................... 228/2;
29/470.3; 156/73

[56] References Cited
UNITED STATES PATENTS

| 3,234,644 | 2/1966 | Hollander.................. | 29/470.3 |
| 3,235,158 | 2/1966 | Hollander.................. | 228/2 |
| 3,380,641 | 4/1968 | Deemie et al............... | 228/2 |
| 3,412,916 | 11/1968 | Dunlap et al. ............. | 228/2 |
| 3,462,826 | 8/1969 | Farmer et al. ............. | 29/470.3 |

OTHER REFERENCES

Vil, Friction Welding of Metals, 1962, pp. 94–96. Coping in group 320.

*Primary Examiner*—John F. Campbell
*Assistant Examiner*—Robert J. Craig
*Attorney*—Larson, Taylor and Hinds ABSTRACT: A friction welding apparatus includes a support, a headstock carrying a rotatable chuck for holding a first workpiece to be welded to a second static workpiece, the headstock being mounted on the support for movement axially of the chuck. Piston and cylinder type displacement means are connected between the headstock and the support for producing axial movement of the headstock and the chuck is provided with rotary drive means incorporating a shaft passing coaxially through the cylinder of the piston and cylinder device.

FRICTION WELDER

BACKGROUND OF THE INVENTION

1. Field of the Invention

This invention relates to a friction welding apparatus more particularly but not exclusively concerned with welding studs or other elements such as tubular elements to a platelike surface, the apparatus having a rotatable chuck for holding a first workpiece which in operation is caused to rotate and is brought into contact with a second workpiece, during which rotation and axial force is applied to the first workpiece, thereby welding the first workpiece to the second workpiece.

2. Description of the Prior Art

Friction welding apparatus of the prior art may be divided into two broad types; the type in which the drive motor is disposed between a piston and cylinder type displacement means and the head stock housing the chuck connected for rotation to the motor by a drive shaft, the piston and cylinder device acting on the motor and the head stock to produce axial movement of the headstock; and the type in which a headstock housing a rotatable chuck holding a first workpiece which is rotated by the chuck and a second workpiece is displaced axially into contact with the rotating first workpiece during a welding operation. In the second type of apparatus the displacement means may comprise a pair of piston and cylinder devices, with the drive motor, drive shaft and chuck being disposed between the devices.

Such friction welding apparatus are bulky, heavy and only semitransportable and it has hitherto been difficult by virtue of their weight and bulk to incline the apparatus at any desired angle to weld, for example a stud or other element to a plate like surface, such as a bulky plate or girder. Moreover, in the second type of apparatus it is not possible when welding from one side to axially displace the girder or plate for example towards the rotating stud by the virtue of their size and weight, and the dimensions of the apparatus. Furthermore when two piston and cylinder devices are provided in the second type of apparatus, the disadvantage of accurately matching the devices is present.

In such friction welding apparatus of the prior art it has not hitherto been possible when the apparatus are arranged in multiple units to weld studs or other elements such as tubes to a plate like surface in the desired number per unit area so that the number of studs per unit area will not permit the welded structure to support loads which could be supported if the number of studs per unit area was increased.

The mass of moving parts in such apparatus increases the time taken to overcome the inertia of the rotating parts and when the apparatus is operated in a vertical position the degree of collapse of the material of the workpiece being welded cannot be so accurately controlled.

Finally, such friction welding apparatus cannot be operated successfully in a nonatmospheric environment such as oil or water.

It is an object of the present invention to provide a friction welding apparatus which is more compact and portable thereby being more flexible in operation and being operable in any attitude.

Another object of the invention is to provide a compact friction welding unit which may be operated in multiple units at close pitch from a single power source.

A further object of the invention is to provide a friction welding apparatus which may be operated at a location remote from any source of main electrical supply.

A further object of the invention is to provide a friction welding apparatus which is capable of welding studs or other elements to a bulky platelike surface such as a girder.

A further object of the invention is to provide a friction welding apparatus which can be operated in a nonatmospheric environment such as oil or water.

SUMMARY OF THE INVENTION

According to the present invention a friction welding apparatus includes a support, a headstock carrying a rotatable chuck for holding a workpiece and being mounted on the support for movement axially of the chuck, displacement means incorporating a pressure fluid operated piston and cylinder device connected between the headstock and the support for producing axial movement of the headstock, and drive means incorporating a drive shaft passing coaxially through the cylinder for rotating the chuck.

BRIEF DESCRIPTION OF THE DRAWINGS

In order that the invention may be more fully understood some embodiments in accordance therewith will now be described, by way of example with reference to the accompanying drawings in which.

DESCRIPTION OF PREFERRED EMBODIMENTS

Figure 1:
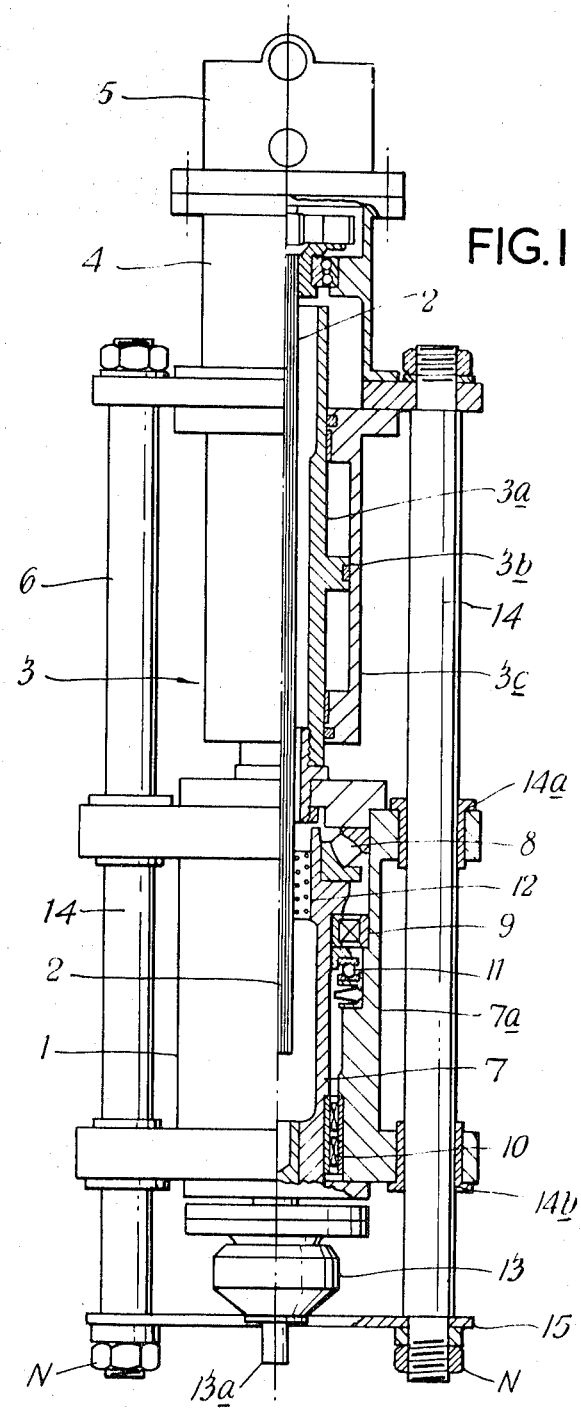
FIG. 1 is a section, partly in elevation, of friction welding apparatus.

Referring to FIG. 1 of the drawings, a friction welding apparatus includes a support incorporating a frame 6, a headstock 1 carrying a rotatable chuck 13 holding a stud 13a or, other element, such as a tubular element, to be welded and being slidably mounted on the support frame 6, for movement axially of the chuck 13, drive means including a drive shaft 2, a fluid motor 5 connected to the drive shaft, through a coupling 4, and displacement means for producing axial movement of the headstock, said means comprising a fluid pressure operated piston and cylinder device 3 disposed between the headstock 1 and the support frame 6.

The headstock 1 includes an arbor 7, a housing 7 A, for the arbor 7, a main thrust bearing 8, arbor support bearings 9 and 10, and an auxiliary thrust bearing 11. The drive shaft 2 projects into the arbor 7 which houses a drive shaft nut 12 connecting the arbor 7 for rotation with the drive shaft 2. The chuck 15 is mounted at one end of the arbor i.e. the lower end as shown in FIG. 1. The drive shaft nut 12 is a low-friction device comprising recirculating elements such as ball bearings through which the torque to drive the arbor is transmitted, and which is capable of axial movement relative to the drive shaft while transmitting this torque. The nut and shaft assembly may be of any suitable type but are preferably of the type shown which are known as a Saginaw Ball Spline Shaft and which are supplied by the Saginaw Steering Gear Division of the General Motor Corporation.

The force cylinder 3c of the piston and cylinder device 3 is disposed around the drive shaft 2, which passes coaxially through the hollow center of a cylinder shaft or piston rod 3a of the cylinder 3c. This cylinder may be of the double-ended type as shown, or of a tailshaft type wherein a countershaft, coaxial with and within the bore of the piston rod, is used to seal the upper chamber of the cylinder. A piston 3b of the piston rod 3 a separates the interior of the cylinder 3c into upper and lower chambers, so that the device 3 is double acting, in a manner to be described. The piston rod 3a projects through the cylinder 3c at one end (the lower end in FIG. 1) to be rigidly connected to the head stock 1.

The motor coupling 4 supports the upper end of the drive shaft 2 and couples the drive shaft 2 to an output shaft of the motor 5. This coupling may be direct to indirect via pulleys. In the illustrated embodiment, the coupling employed is a flexible rubber coupling such as that marketed under the Trade Name "Layrub."

The fluid motor 5 is hydraulically operated and may be of fixed displacement for fixed speed operation or variable displacement in order to vary the operating speed.

The support frame 6 is a torsionally stiff structure supporting the main components and includes two spaced apart elongate guide members 14 which pass through bores 14a and 14b in upper and lower peripheral flanges of the arbor housing 7A. The frame also includes transverse web members 15 which provide the structural rigidity of the frame 6 in conjunction with the guides 14. The guides 14 may or may not be cylindrical.

Figure 2:
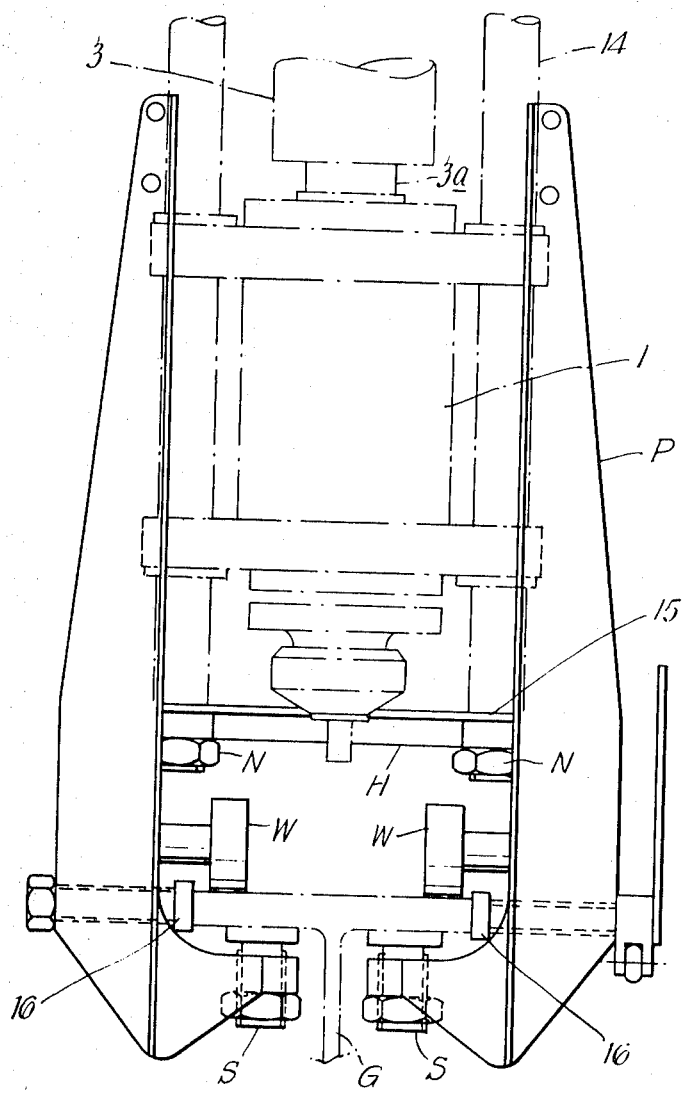
FIG. 2 shows a typical fixture supporting the apparatus of FIG. 1.

To enable the welding apparatus to be supported, the support may include a support fixture such as those shown in FIGS. 2, and 4 to 6, or any other appropriate support means. FIG. 2 shows the general arrangement of a typical support fixture for supporting the welding apparatus of FIG. 1 and also shows a second workpiece to which the stud 13a or other element is to be welded. In this for sustaining the second workpiece is a girder section G to which it is desired to weld a stud or other element carried by the chuck 13. The support fixture serves to support the welding apparatus and is itself supported by the workpiece. As illustrated, the lower end of the fixture is clamped to the girder by adjustable clamps 16. The clamps 16 may be manually or power operated. Adjustable supports or reaction pads S are provided beneath the girder G and resist downward movement of the girder when welding force is applied thereto. The clamps 16 and supports S form means for sustaining the axial and torsional loads produced on the second workpiece during welding.

The fixture includes vertical plates P and a horizontal plate H, the horizontal plate H having two apertures therein for receiving the lower ends of the guides 14. To mount the welding apparatus in the fixture, the nuts N are removed from the lower ends of the guides 14 and the lower ends of the guides entered in the apertures of the plate H so that the lower web 15 of the apparatus rests on the plate H. The nuts N are then used to secure the guides 14 with respect to the plate H, and clamps (not shown) employed to secure the upper ends of the plates P to the guides 14. Wheels or rollers W are provided to facilitate movement of the entire structure consisting of the fixture and the welding apparatus along the girder from one weld station to another. The entire structure may, however, be stationary and means provided for advancing the girder.

Figure 3:
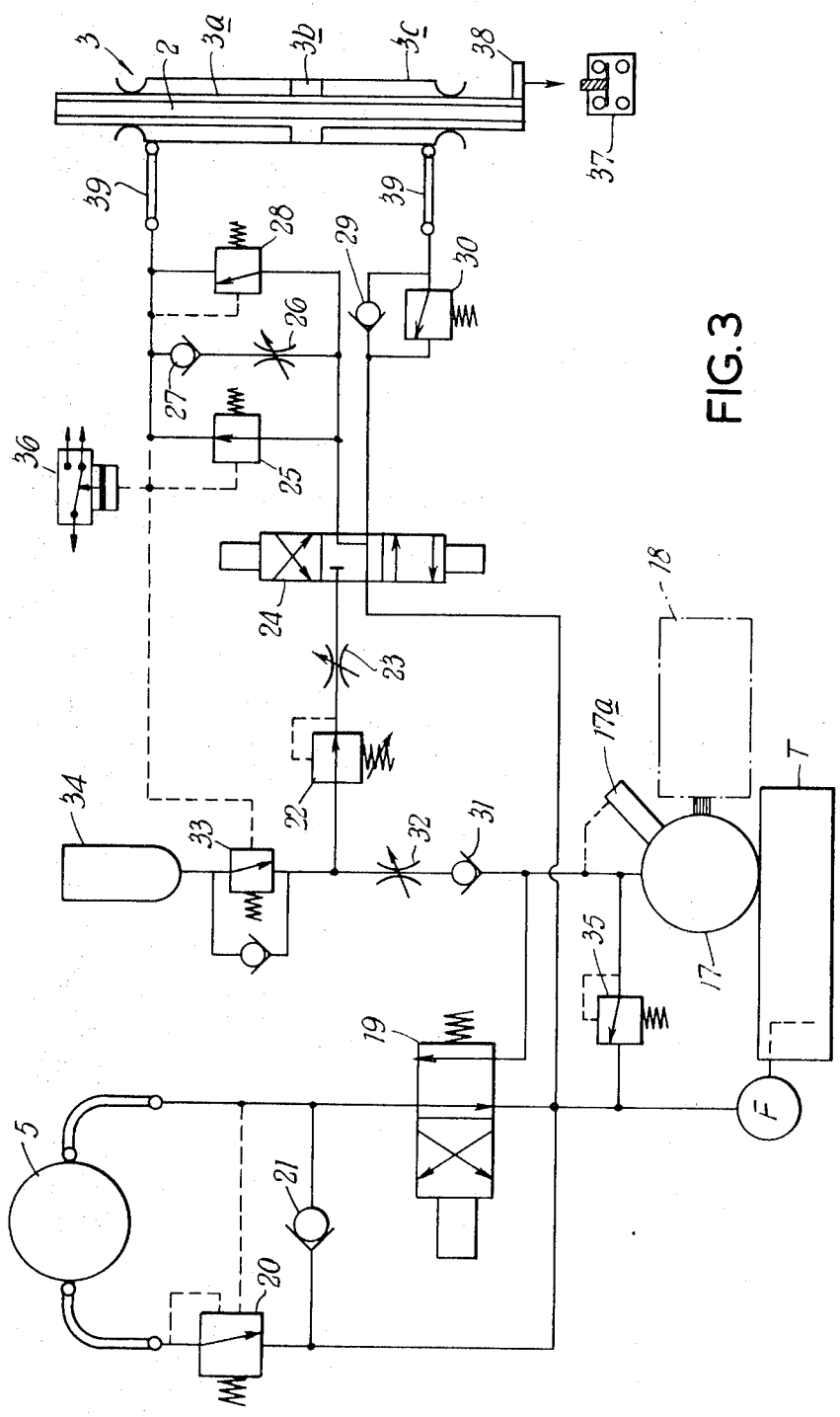
FIG. 3 is a schematic diagram of a control system for the friction welding apparatus.

Referring now to FIG. 3, there is shown a pressure compensated variable displacement pump 17, the compensator of which is designated by the reference 17a. The pump 17 is by a prime mover 18 which may be a synchronous induction motor or an internal combustion engine. The fluid output of this pump 17 is used to drive the hydraulic motor 5 and provide pressurized to the cylinder 3c.

Dealing firstly with the hydraulic motor 5, this is supplied with fluid by the pump 17 through a solenoid operated directional control valve 19 which has two positions. With the control view 19 in the position shown i.e. its solenoid is deenergized the fluid path from the pump 17 and the pressure compensator 17a reduces the pump output to zero at the compensating pressure. When the solenoid of the control valve 19 is energized the valve moves to its other position, the fluid path from the pump 17 is opened, the line pressure falls and the compensator actuates the pump 17 to deliver its full flow to the motor 5 via the valve 19. The fluid flow causes the motor 5 to rotate, driving the arbor 7 and the chuck 13 carrying the stud 13a to be welded to the girder G, by way of the drive shaft 2. A pilot operated counterbalance valve 20 is controlled by the pressures at the inlet and outlet of the motor 5 and is normally open when the motor 5 is running whereby the return line from the motor 5 is open to a tank T via a filter F. To arrest rotation of the motor 5, the solenoid of the control valve 19 is deenergized (as will be explained hereinafter) and the valve moves to the position shown, so that the fluid path from the pump 17 is closed. The inertia of the rotating parts of the welding apparatus tends to drive the motor which thus tends to operate as a pump. This rotation is resisted by a back pressure caused by the counterbalance valve 20 which, by virtue of the changes in the control pressures applied thereto when the valve 19 disconnected the pump 17 from the motor 5, has closed. The resistance to rotation can be varied by adjusting the pressure setting of the valve 20 and thus controlling the braking rate of the motor 5. While the valve 20 is functioning to build up a back pressure, it periodically opens for very short times to relieve the back pressure. When the valve 20 opens, the increase in pressure at the inlet of the valve 21 causes this valve to open so that the fluid is either returned to the motor or to the tank T via the valve 19.

Axial movement of the headstock 1 i.e. vertical movement in FIGS. 1 and 2 is also caused by fluid delivered from the pump 17 and fluid is delivered to the motor 5 to cause rotation of the chuck 13 as hereinbefore described at any appropriate moment before the stud 13a contacts the girder G.

Before welding commences and between the successive weldings of each stud 13a to the girder G, an accumulator 34 is charged with fluid from the pump 17 at a controlled rate through a nonreturn valve 31, a flow control valve 32 and a normally closed sequence valve 33 via its integral nonreturn valve. When the accumulator is fully charged the pressure compensator 17a reduces the fluid output of the pump 17 to a minimum. This stored supply of fluid in the accumulator 34 ensures that the welding head is uneffected by fluctuations in the pump output pressure caused by the transmission load during welding. The pressure level at which the accumulator discharges is controlled by the setting of the sequence valve 33. The fluid for producing axial movement is delivered through a pressure control valve 22 by means of which the magnitude of the force is controlled, through a flow control valve 23 controlling the fluid supply rate to the cylinder 3c and through a three position directional control valve 24 operated by two solenoids. With one solenoid of the directional valve 24 energized the valve is in a first of its positions, and fluid passes from the pump 17 through a sequence valve 25 which allows full flow to the upper chamber of the cylinder 3a to produce axial movement of the piston rod 3a which causes the headstock 1 to move downwardly in FIG. 1 at a first, fast rate to bring the stud 13a or other element carried by the chuck 13 towards the girder G. When the workpieces to be welded meet, the pressure in the fluid supply line to the upper chamber immediately rises for the piston rod 3a is no longer free to be moved downwardly thereby producing an axial force on the workpieces being welded. The sequence valve 25 is then closed by the action of the pilot pressure signal derived from the line connecting the pump 17 to the upper chamber of the cylinder 3c. Fluid then flows, during the initial stage of welding, through a flow control valve 26 and a nonreturn valve 27 into the upper chamber of the cylinder 3c. The flow control valve 26 reduces the flow of fluid to the cylinder 3c thereby controlling the rate of buildup of pressure in the upper chamber of the cylinder 3c during the initial stage of welding. At a predetermined pressure in the upper chamber of the cylinder 3c, controlled by the setting of a normally closed sequence valve 28, the valve 28 opens so that the fluid bypasses the valves 25, 26, 27 and allows the headstock 1 to move downwardly at the speed at which collapse occurs of the material of the stud 13a or other element at the weld region, at the same time maintaining the axial force exerted by the piston rod 3a.

A counterbalance valve 30 is used to maintain a back-pressure in the lower chamber of the cylinder 3c to control the axial approach movement of the chuck 13 prior to contact of the work piece and to prevent the headstock 1 descending under gravity when the apparatus is not in use.

To lift the chuck 13 away from the girder G after completion of welding, the other solenoid of the directional valve 24 is energized so that the valve moves to a third position in which fluid flows to the lower chamber of the cylinder 3c, this fluid bypassing the counterbalance valve 30 and flowing through a nonreturn valve 29.

A pressure operated switch 36 is subjected to the pressure in the line to the upper chamber of the cylinder 3c. When the stud 13a in the chuck 13 contacts the girder G, the pressure in the upper chamber immediately increases and the switch 36 is closed to bring a microswitch 37 on the girder G into the circuit in which it can be actuated. During welding, the stud 13a moves downwardly through a further distance, for example, one-eighth inch as the material of the stud at the weld region collapses as aforesaid, and eventually the switch 37 is closed as by a mechanical contact on the headstock 1. Alternatively the switch 37 may be on the headstock and the mechanical contact 38 is formed by or disposed on the girder G. This results in the solenoids of the valve 24 being deenergized so that it adopts the second of its positions, center position illustrated, and also results in deenergization of the valve 19 so that it also adopts the position shown. Hence the motor 5 ceases to rotate, and the upper and lower chambers of the cylinder 3c are connected to the tank T. It is desirable for the motor to stop rotating before the downward force exerted by the piston rod 3a of the cylinder 3c is removed. The chuck 13 can then be released by any appropriate means and in the manner described, the headstock 1 raised.

A safety valve 35 is provided between the pump output side and the filter F.

A welding operation is initiated by any suitable control means associated with the control circuit.

Figure 4:
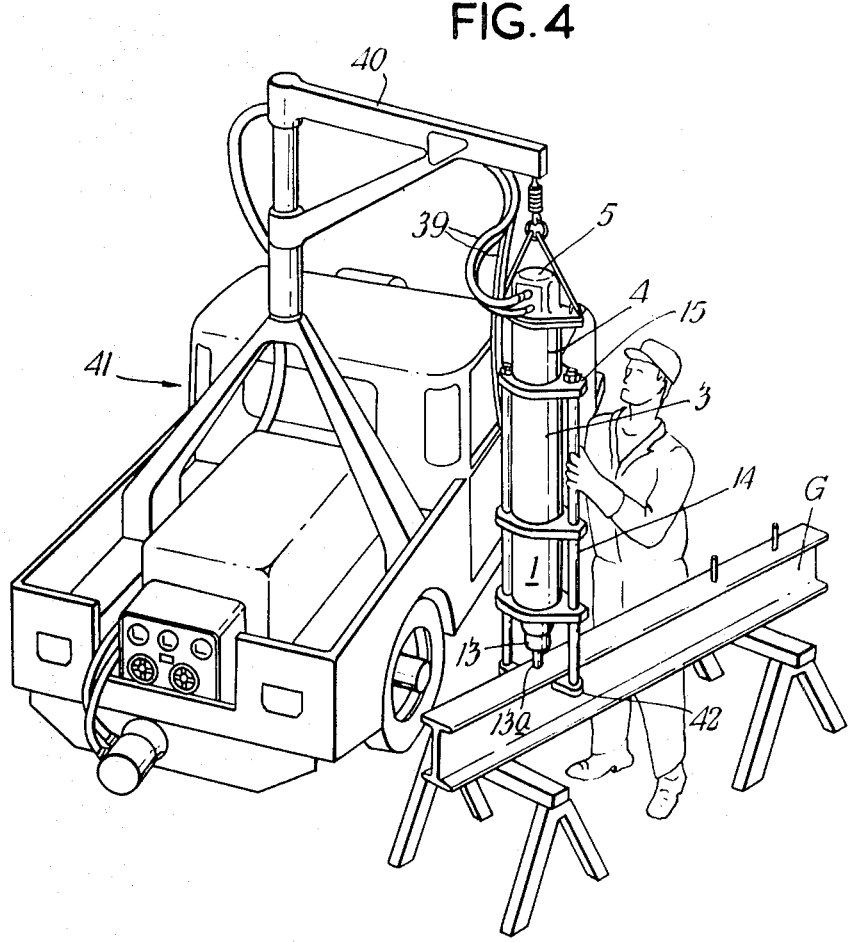
FIG. 4 is a perspective view of a modification of the welding apparatus of FIG. 1 supported by a motor vehicle.

Referring now to FIG. 4, this shows welding apparatus supported from an overhead jib 40 which is itself mounted on a motor vehicle 41. In the embodiment illustrated in FIG. 4, the lower ends of the guides 14 have mounted thereon elements 42 which engage beneath the flange of the girder G to secure the welding apparatus in position with respect to the beam and perform the same function as the supports S and clamps 16 in FIG. 2. The arrangement shown in FIG. 4 may be employed at locations remote from any source of main electrical supply.

Figure 5:
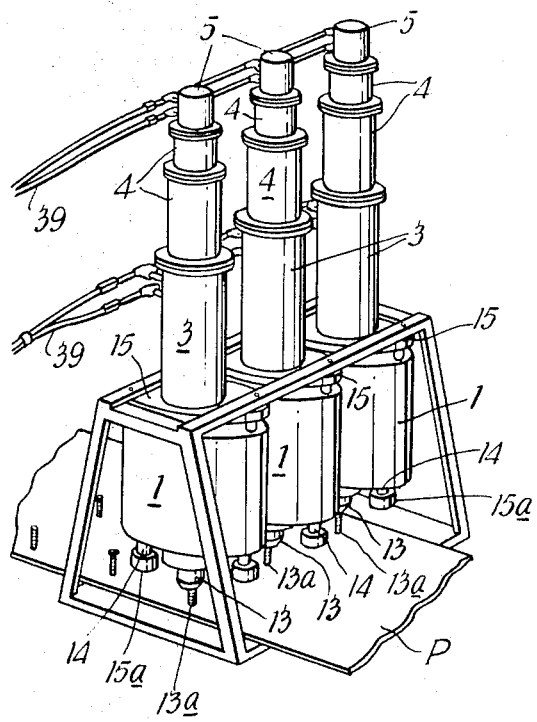
FIG. 5 shows another embodiment of friction welding apparatus.

The fixture shown in FIG. 5 permits rows of studs to be welded to the second workpiece in the form of a plate P which plate P is supported on the base of the fixture there being three studs 13a in each row, the welding apparatus itself comprising three units of the type similar to that shown in FIG. 1 for example. The lower members 15 of the frame 6 of each unit have replaced by pad elements 15a secured to the lower ends of the guides 14. Only a single pump 17 may be employed. The fixture base forms means for sustaining the axial load produced on the second workpiece during a welding operation.

Figure 6:
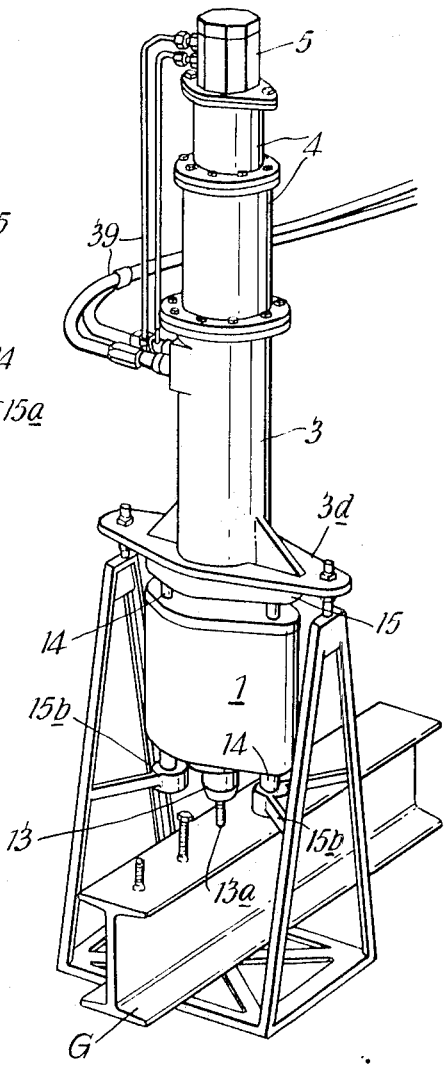
FIG. 6 illustrates a further embodiment of friction fixture with welding apparatus.

Referring finally to FIG. 6, there is shown a further modified form of fixture on the base of which a girder G is supported the fixture being secured to the welding apparatus by way of a support web 3d which projects outwardly from the device 3, and by way of the lower ends of the guides 14. The upper member 15 of the frame 6 is rigidly connected to the web 3d, and the lower ends of the guides 14 are secured in members 15b of support fixture.

FIGS. 4, 5 and 6 also show the hydraulic connections 39 of the control circuit to the motor 5 and device 3. (see also FIG. 3).

It will be apparent from FIGS. 5 and 6 that, in contrast to FIGS. 1, 2 and 4 the device 3 is mounted on the upper surface of the upper member 15 of the frame 6 and the support includes the respective housings of the motor 5 and coupling 4 and device 3 through which housings the motor 5, coupling 4 and device 3 are supported on the upper web member 15.

It will be understood that the friction welding apparatus described need not be arranged to that the movement of the headstock 1 is vertical, but the apparatus may be inclined at any desired angle, to enable studs or other elements to be welded to surfaces which are not horizontal.

I claim:
1. A friction welding apparatus comprising:
    a. an elongate support; b. a headstock mounted on the support for displacement longitudinally of the support;
    c. an arbor rotatably mounted in the headstock;
    d. a chuck carried by the arbor for holding a first workpiece;
    e. a single pressure-fluid operated piston and cylinder device connected between the support and the headstock for producing said longitudinal displacement, said device and chuck being disposed at opposite ends respectively of the headstock;
    f. drive means for rotating the arbor during a weld including a drive motor supported by the support adjacent the end of the cylinder remote from the headstock and a single drive shaft which is connected to said motor and which passes coaxially through, and is mechanically independent of, the piston and cylinder, with an end portion of the shaft projecting into said arbor;
    g. a splined connection between said projecting end portion of the shaft and said arbor for permitting simultaneous rotation of said arbor and longitudinal displacement of said headstock during the weld; and
    h. means on said support to cooperate with a second workpiece for sustaining axial load produced on the second workpiece during the weld.

2. An apparatus as set forth in claim 1 wherein the drive motor is an hydraulic motor.

3. An apparatus as set forth in claim 1 wherein the piston and cylinder device is double acting and the piston is mounted on a hollow rod through which the drive shaft passes and which projects through one end of the cylinder, the projecting end of the rod being connected to the headstock.

4. An apparatus as set forth in claim 3 wherein the support is in the form of a frame comprising two elongate spaced apart guide members secured together at one or each end by a transverse web member with said cylinder mounted on a web member and with said headstock slidably mounted on said two guide members.

* * * * *